United States Patent [19]

Seluk

[11] Patent Number: 4,651,391
[45] Date of Patent: Mar. 24, 1987

[54] ELASTIC STRAP CLAMP

[75] Inventor: Daniel C. Seluk, Derry, N.H.

[73] Assignee: Vuarnet, El Segundo, Calif.

[21] Appl. No.: 869,038

[22] Filed: May 30, 1986

[51] Int. Cl.⁴ .............................................. F16B 19/00
[52] U.S. Cl. ...................................... 24/703; 24/3 C; 24/23 W; 29/515
[58] Field of Search ..................... 24/703, 23 W, 23 R, 24/30.5 W, 20 W, 20 CW, 20 R, 3 C, 115 A, 3 M; 29/515, 509, 517; 411/501, 502, 503

[56] References Cited

U.S. PATENT DOCUMENTS

| | | | |
|---|---|---|---|
| 3,261,063 | 7/1966 | Rutty | 24/23 W |
| 3,349,442 | 10/1967 | Buy | 24/23 W |
| 4,059,866 | 11/1977 | Rohland | 29/517 X |
| 4,159,792 | 7/1979 | Siegal | 24/3 M |

Primary Examiner—Philip C. Kannan
Attorney, Agent, or Firm—Hayes, Davis & Soloway

[57] ABSTRACT

A clamp for clamping a plurality of strips of compressible material together comprising, a resiliently rigid plate member; a pair of vertical bar members carried by the plate member normal thereto and disposed parallel to one another at a distance generally equal to the width of the strips to be clamped together; a horizontal bar member shorter in length than the distance and disposed in parallel, spaced relationship to the plate member; and, a pair of joining bar members connected between respective ones of the ends of the vertical bar members and the horizontal bar member, the joining bar members forming and angle of between 120° and 150° with the horizontal bar member; and wherein, the vertical bar members, the horizontal bar member, and the joining bar members are of a resiliently rigid and deformable material.

The clamp is used by, placing the stacked strips to be clamped together within the clamp; applying pressure towards the horizontal bar member on the points where the joining bar members meet the horizontal bar member thereby arching and pressing the horizontal bar member towards the plate member until the strips have been compressed under said horizontal bar member and the joining bar members have toggled over center from an original position at approximately 135° upward to a position approximately 135° downward; and, applying pressure on the points where the joining bar members meet the vertical bar members in a direction to urge the vertical bar members back towards one another and a perpendicular position relative to the plate member whereby the vertical bar members hold the horizontal bar member firmly against the compressed strips.

15 Claims, 12 Drawing Figures

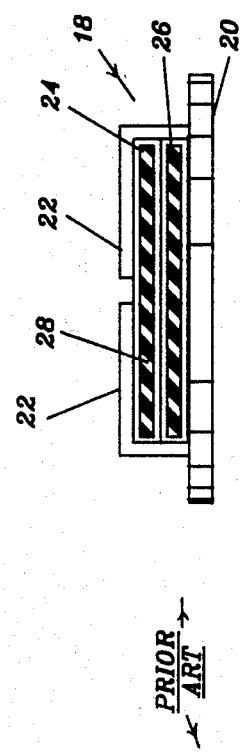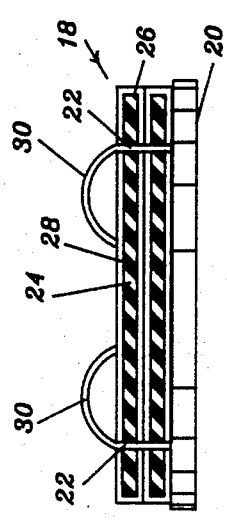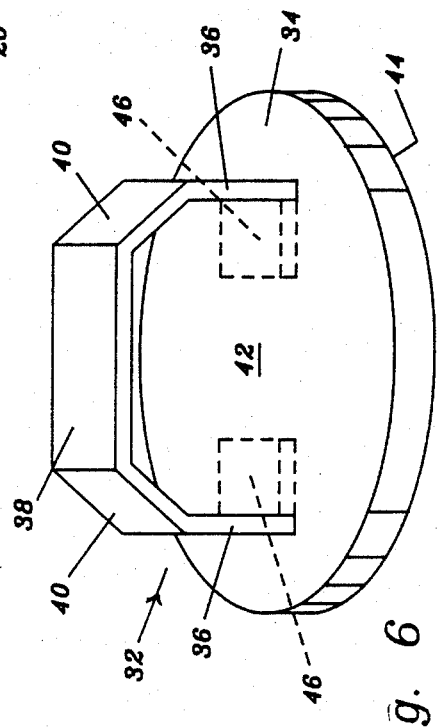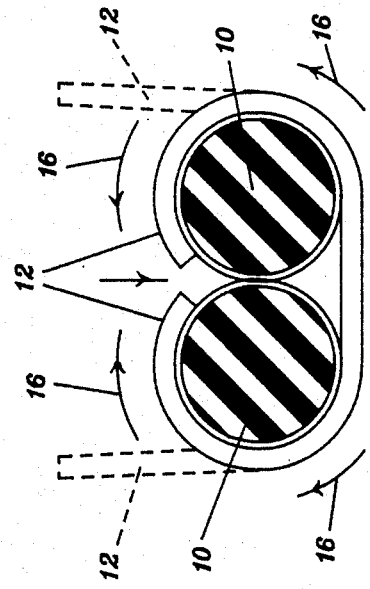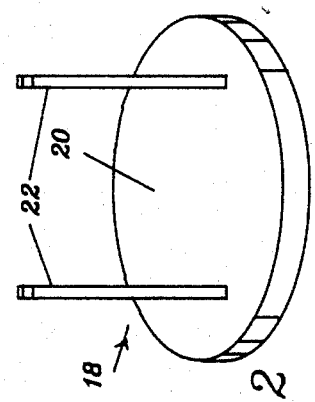
Fig. 1 PRIOR ART
Fig. 2 PRIOR ART
Fig. 3 PRIOR ART
Fig. 4
Fig. 5
Fig. 6

ELASTIC STRAP CLAMP

BACKGROUND OF THE INVENTION

This invention relates to fasteners for fastening a plurality of elongated members together at a point and, more particularly, to a clamp for clamping a plurality of strips of compressible material together comprising, a plate member; a pair of vertical bar members carried by the plate member perpendicular thereto and disposed parallel to one another at a distance generally equal to the width of the strips to be clamped together; a horizontal bar member shorter in length than the above-described distance and disposed in parallel, spaced relationship to the plate member; and, a pair of joining bar members connected between respective ones of the ends of the vertical bar members and the horizontal bar member, the joining bar members forming an angle of between 120° and 150° with the horizontal bar member; and wherein, the plate member, the vertical bar members, the horizontal bar member, and the joining bar members are all of a resiliently rigid and deformable material.

The fastening of two or more elongated members together at a point is a very old problem. One of the oldest and well known examples is the forming of an eye in the end of a piece of rope or line. The strand is folded back upon itself to form a loop and then the two adjacent strands are fastened together in a parallel relationship to permanently form the eye. The procedure is substantially the same for small lines up to the large hawsers used to tow large ocean-going ships.

Early braided ropes where braided together at the point of fastening. The process was generally time consuming, but in the early days of sailing ships it was a means of occupying time on long voyages. With the advent of large steel cables, and the like, and the need for more rapid means of accomplishing the same fastening function, clamping type fasteners were developed. One popular type of fastener for clamping two lines together is typified by U.S. Pat. Nos. 4,059,866 (Ellis) and 4,052,376 (Rohland). In such fasteners as used with strands or lines, a cylindrical or oval sleeve is slipped over the two strands at the point of juncture and then the sleeve is swaged or crimped to clamp the two strands together. A plurality of strands can also be fastened together in that manner as shown in U.S. Pat. No. 3,034,195 (Leclabart). Such a swaged sleeve imparts a generally uniform inward crushing force on the strands. With large ropes, lines, and the like, however, the clamping force is generally not a problem. Clamps of related structure as employed in similar applications are also shown in U.S. Pat. Nos. 3,078,532 (Bywater) and 3,082,794 (Wahl).

Eyeglass retainers are a relatively recent inventive concept. They generally fall into one of two categories—convenience and sport. Both types attach to the temple pieces of the eyeglasses and comprise a loop which passes around the neck or head of the wearer. The convenience retainers are generally of a non-stretchable cording and are longer. They merely hang in loops down from the temple pieces and provide a means of suspending the glasses from the neck of the wearer when not positioned on the nose. In this regard, they are a form of lanyard and any required loops can be formed and fastened using methods and apparatus known in the lanyard art. This includes miniature versions of the swaged sleeve described above. Usually, a small loop of elastomeric material, such as neoprene, is attached to a loop or eye formed in each end of the cording material used for the retainer. The neoprene loops are stretched and slid onto the temple pieces of the glasses to hold the retainer on the glasses. Various fasteners as employed in the construction of lanyards, lanyard type eyeglass retainers, and the like, are shown in U.S. Pat. Nos. 4,159,792 (Siegal), 3,861,813 (Seron), 754,358 (Spohn), 3,879,804 (Lawrence), 2,481,946 (Pendleton), 2,648,255 (Pendleton), 2,649,020 (Wheeler), and 3,827,790 (Wenzel).

Sport retainers are a more recent addition which followed close on the heels of the development of rugged eyeglasses with plastic lenses and frames of Nylon or high impact plastic which could be conveniently and safely worn even during sports such as skiing, basketball and football. Such retainers generally comprise an elastomeric, fabric covered stretch band adapted to stretch around the back of the wearers head and hold the glasses firmly in position on the nose even in the presence of shocks and blows to the head. A typical example is shown in U.S. Pat. No. 4,133,604 (Fuller).

The wider, band-type sport retainers create a problem not present in the convenience retainers, which are made of cording material—the manner of fastening the wide elastic band to the temples of the glasses. As can be seen in the Fuller patent, the invention therein is the longitudinal folding of the band adjacent the ends to form integral longitudinal elastic tubes which are then slipped onto the temple pieces of the glasses.

If one desires to employ the neoprene loop method of attachment to the glasses described above with a sport retainer, there is no clamping arrangement presently available which will do the job. As shown in FIG. 1, a fold-over type crimping clamp like that employed in Siegal or Leclabart can be employed with elastomeric cording such as that generally indicated as 10 in FIG. 1. As the ends 12 of the clamp 14 are rolled and compressed in the direction of arrows 16 from their original position (shown ghosted) to the final position of FIG. 1, a uniform inward crimping or clamping action is created as described above. Since the cording is cylindrical, the uniform crushing is generally esthetically acceptable and the holding power is sufficient to keep the two pieces of cording 10 from pulling through the clamp 14 in normal use. As will be readily recognized, however, if the clamp 14 of FIG. 1 were used with a wide band such as that of Fuller to create an eye at each end thereof, the esthetic results would be completely unacceptable from a commercial sales point of view as the band would be crushed and deformed at the point of crimping.

The use of a staple type configuration as shown in FIGS. 2–5 was also investigated by the applicant herein and found to be unacceptable. As shown in FIGS. 2 and 3, a staple fastener 18 was formed as a plate 20 having a pair of parallel, spaced ears 22 extending perpendicular therefrom. FIGS. 4 and 5 depict the various possibilities for fastening a pair of elastomeric straps 24 together with the fastener 18. The ears 22 can be folded as shown in FIG. 4 or rolled (in typical staple fashion) as shown in FIG. 5. The ears 22 can be disposed around the outsides of the straps 24 as shown in FIG. 4 or punched through the straps 24 as shown in FIG. 5. While around and folded and punched through and rolled are the forms depicted in the figures, those skilled in the art will also recognize that the configurations of around and rolled and punched through and folded could also be accomplished. All four methods of use were tried with unacceptable results. When the ears 22 are disposed around the straps and either folded or rolled, there is insufficient holding power to prevent pull-through if the plate is not crushed and deformed. The back side is generally unpleasing esthetically as well. Punching the ears 22 through the strap 24 created a multitude of problems both structurally and esthetically. The fabric covering 26 tended to be cut and frayed while the neoprene inner material 28 also tended to cut and pull through. In general, the folded configuration of FIG. 4 tended to be smoother and more esthetically pleasing while the rolled configuration of FIG. 5 was stronger but looked poor and had inwardly extending loops 30 which could catch and pull the wearer's hair.

All in all, the results of attempting to use any of the prior art fastening methods with elastomeric strap material produced completely unacceptable results.

Wherefore, it is the object of the present invention to provide a fastener for use with elastomeric strap material which will provide a point of fastening which is esthetically pleasing in appearance while providing ease of use and a strong, pull-through resistant joint.

It is a further object of the present invention to provide a fastener for use with elastomeric strap material which incorporates a logo plate as part thereof whereby a decorative logo can be provided easily on the outside, viewable surface at the point of joining the strap material.

SUMMARY

The foregoing objects have been accomplished in the clamp of the present invention for clamping a plurality of strips of compressible material together comprising, a plate member; a pair of vertical bar members carried by the plate member perpendicular thereto and disposed parallel to one another at a distance generally equal to the width of the strips to be clamped together; a horizontal bar member shorter in length than the distance and disposed in parallel, spaced relationship to the plate member; and, a pair of joining bar members connected between respective ones of the ends of the vertical bar members and the horizontal bar member, the joining bar members forming an angle of between 120° and 150° with the horizontal bar member; and wherein the plate member, the vertical bar members, the horizontal bar member, and the joining bar members are all of a resiliently rigid and deformable material.

In the preferred embodiment, the vertical bar members, the horizontal bar member, and the joining bar members are of unitary construction; the angle is 135°; all the members are of the same solderable material; and, the vertical bar members are soldered to the plate member. Additionally, the surface of the plate member opposite the one carrying the the vertical bar members, the horizontal bar member, and the joining bar members is adapted to carry logo indicia thereon.

The above clamp is used to clamp a plurality of strips of compressible material together by the steps comprising, placing the stacked strips to be clamped together within the clamp; applying pressure towards the horizontal bar member on the points where the joining bar members meet the horizontal bar member thereby arching and pressing the horizontal bar member towards the plate member until the strips have been compressed under said horizontal bar member and the joining bar members have toggled over center from their original position at approximately 135° upward with respect to the vertical bar member to a position approximately 45° downward with respect thereto; and, applying pressure on the points where the joining bar members meet the vertical bar members in a direction to urge the vertical bar members back towards one another and a perpendicular position relative to the plate member whereby the vertical bar members hold the horizontal bar member firmly against the compressed strips.

The member could also be spot welded or glued together provided the materials thereof are suitably chosen.

DESCRIPTION OF THE DRAWINGS

FIG. 1 is a cutaway end view of a pair of elastomeric cords being joined by a prior art crimping clamp.

FIG. 2 is a perspective view of a prior art staple type fastener.

FIG. 3 is a side view of the fastener of FIG. 2.

FIG. 4 is a cutaway end view of a pair of elastomeric strips being joined by the fastener of FIGS. 2 and 3 in a first manner.

FIG. 5 is a cutaway end view of a pair of elastomeric strips being joined by the fastener of FIGS. 2 and 3 in a second manner.

FIG. 6 is a perspective view of the clamp of the present invention.

DESCRIPTION OF THE PREFERRED EMBODIMENT

Figure 9:
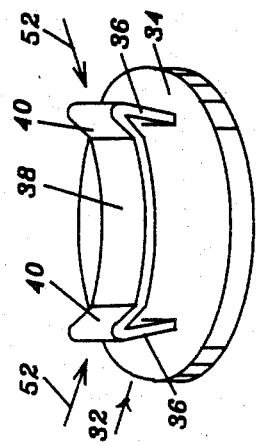
FIGS. 7–10 are perspective views of the clamp of the present invention showing the steps of clamping it.
Figure 10:
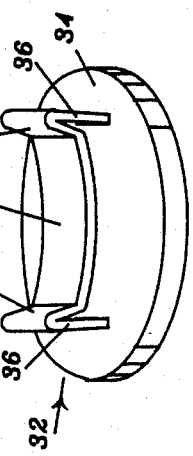

The clamp of the present invention is shown in perspective in FIG. 6 wherein it is generally indicated as 32. In general, the clamp 32 comprises a substantially rigid plate member 34 from which extend perpendicularly two vertical bar members 36. A horizontal bar member 38 is disposed parallel to the plate member 34 and connected to the ends of the vertical bar members 36 by joining bar members 40.

While for larger uses the construction of the clamp 32 would be of heavy weight material, as described herein, the clamp is intended for use in the joining of strap material as employed in sport type glasses retainers as manufactured and sold by the assignee of this invention. Thus, in the commercial embodiment, the above described members 34, 36, 38 and 40 are all of relatively thin brass. Any other similar material would work, however. The only criteria is that the material be resiliently rigid and deformable. While the members 36, 38 and 40 could be made individually and joined at their ends (and might well be in a larger clamp) in the embodiment being described for the indicated purpose, it was preferred to form those members of a single strip of brass.

Again, because of the particular use and the desire to make the clamp more esthetically pleasing in that use, the members 36, 38 and 40 are carried on what in use will be the inner surface 42 of the plate member 34 while the outer surface 44, i.e. that surface viewable when the retaining band (not shown) is worn, is made flat and smooth and adapted to remain so during assembly and use of the clamp 32 such that a logo indicia (not shown) can be attached thereto as with adhesive.

Brass as a material offers many advantages. In addition to being resiliently rigid and deformable as required for performance in the manner to be described shortly, it does not rust when subjected to perspiration or snow and is solderable. Accordingly, in the preferred embodiment, the vertical bar members are provided with tabs 46 (shown ghosted) which are sweat soldered to the plate member 34. As those skilled in the art will recognize, the clamp 32 of the present invention could be of unitary construction where the plate member 34 extended only between the ends of the vertical bar members 36 in place of the tabs 46. In such optional unitary construction, the plate member 34 could be a bar substantially like the remaining members 36, 38, and 40; or, could be of round or oval shape by starting with a blank somewhat like a finger ring from which the clamp is then formed.

As will be appreciated, benefits are not usually gained without certain drawbacks as well. In the case of the clamp of the present invention, the drawback is a lack of a wide range of sizes that can be accommodated by any one clamp configuration; that is, whereas the staple fastener of FIG. 2 could accommodate any thickness from the thinnest to whatever would fit within the ears 22 with sufficient left for folding or rolling, as will be seen and appreciated from the description that follows hereinafter, the clamp of the present invention is configured in each case to accept a thickness range both as to minimum as well as maximum.

Figure 8:
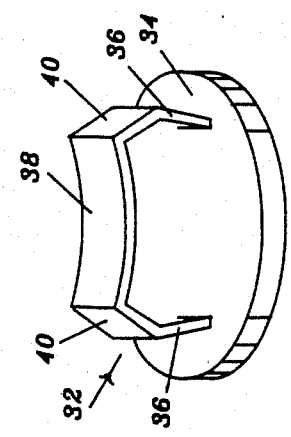

Turning now with particularity to FIGS. 7-10, the method by which the clamp 32 is clamped and the physiological changes in the clamp 32 which provide its novel clamping action will be described in detail. The stacked strips to be fastened (not shown for clarity with respect to the clamp's functioning) are placed within the opening 48 defined by the members 34, 36, 38 and 40 and the clamp 32 is positioned where it is to be fastened. With the plate member 34 supported, a pressure is applied, as indicated by the arrows 50, at the points where the horizontal bar member 38 joins the joining bar members 40. This pressure forces the horizontal bar member 38 towards the plate member 34, compressing the strips (not shown) therebetween. Because of the nature of the materials employed and the specific points of applying the pressure, certain other physiological changes take place as well. As depicted in FIG. 8, the joining bar members 40 start to be rotated downward about the point of their joining the vertical bar members 36. As will be described in greater detail herein shortly, the joining bar members 40 are much shorter than the horizontal bar member 38. As a result, as the joining bar members 40 rotate downward and the total length between the ends of the vertical bar members 36 increases, the horizontal bar member 38 is arched and the vertical bar members 36 are forced outward. As the pressure application points move closer to the plate member 34, the joining bar members 40 actually toggle over center from being 135° upward to 45° downward with respect to the vertical bar members 36 until, with the strips (not shown) compressed by the horizontal bar member 38, the clamp is in the position of FIG. 9 with the vertical bar members 36 forced slightly outward. An inward force, as indicated by the arrows 52, is then applied to the vertical bar members 36 forcing them back towards a perpendicular position with respect to the plate member 34 and, simultaneously, locking the joining bar members 40 in their position. The arched horizontal bar member 36 is then locked by the joining bar members 40, under a compressive force, created by the resilient flexibility of the material, against the strips (not shown).

Figure 12:
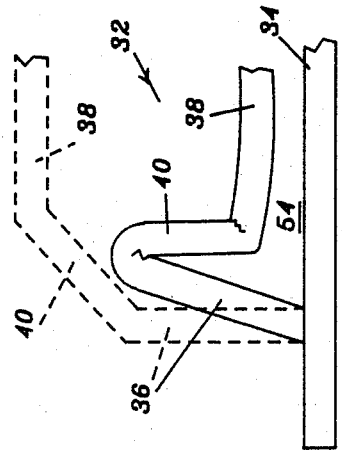
FIG. 12 is the enlarged view of FIG. 11 showing the clamp after it has been clamped.
Figure 11:
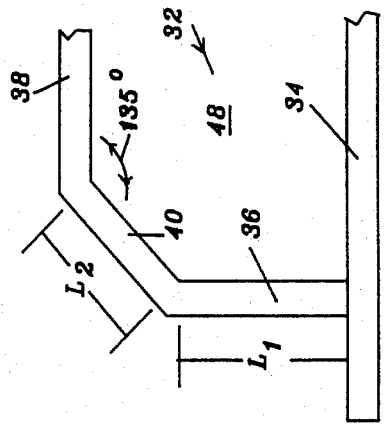
FIG. 11 is an enlarged view of a portion of the clamp of the present invention showing the construction thereof.

An additional understanding of the sizing of the components of the clamp 32 and the manner of operation thereof will be gained by reference to FIGS. 11 and 12. As shown in FIG. 11, the joining bar members 40 meet the horizontal bar member 38 at the ends thereof in approximately a 135° angle. The angle could be in a range of 120° to 150°, but the 135° angle shown has been found to give superior results and is, therefore, preferred. With such an angular orientation, it can be seen that the length of the horizontal bar member 38 is just slightly shorter than the distance between the vertical bar members 36. With strips that are quite wide with respect to their thickness, the joining bar members 40 are quite short with respect to the length of the horizontal bar member 38 as mentioned above. While the compressive force as described above is adequate for holding various widths of strips, for aesthetic reasons, it is preferred that the distance between the vertical bar members 36 be substantially equal to the width of the strips to be fastened thereby.

The lengths of the joining bar members 40 and the verticle bar members 36 determine the thickness of material that can be successfully clamped. This can best be understood with reference to FIG. 12. Because of the thickness of the material employed in the use being described herein, the losses from bending are negligible and, therefore, ignored. Thus, as shown in FIG. 12, the thickness at gap 54 is what determines the thickness to be clamped. As will be appreciated from studying the drawings, the thickness of gap 54 is substantially equal to the length $L_1$ of the vertical bar members 36 less the length $L_2$ of the joining bar members 40 or, in other words, Gap $L_1-L_2$.

Thus it can be seen from the above description and accompanying drawings that the clamp of the present invention has truly met its objectives by providing a clamp for use with compressible strips which is truly novel and unique.

Figure 7:
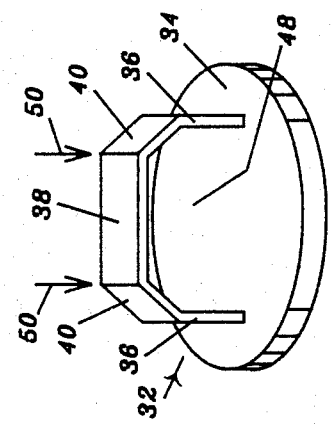

During the first stage of bending the application of force as shown in FIG. 7 causes the downward curvature of portion 38 (FIG. 8). The bending that results is as shown in FIG. 8. This has a positive effect on the clamping action because of the residual bending strain imparted during the first stage of bending.

Wherefore, having thus described my invention, I claim:

1. A clamp for clamping a plurality of strips of compressible material together comprising:
    (a) a plate member;
    (b) a pair of vertical bar members carried by said plate member perpendicular thereto and disposed parallel to one another at a distance greater than the width of the strips to be clamped together;
    (c) a horizontal bar member shorter in length than said distance and disposed in parallel, spaced relationship to said plate member; and,
    (d) a pair of joining bar members connected between respective ones of the ends of said vertical bar members and said horizontal bar member, said joining bar members forming an angle of between 120° and 150° with said horizontal bar member; and wherein,
    (e) said plate member, said vertical bar members, said horizontal bar member, and said joining bar members are all of a resiliently rigid and deformable material.

2. The clamp of claim 1 wherein:
the clamp is of unitary construction.

3. The clamp of claim 1 wherein:
said vertical bar members, said horizontal bar member, and said joining bar members are of unitary construction.

4. The clamp of claim 1 wherein:
the surface of said plate member opposite the one carrying said said vertical bar members is adapted to carry logo indicia thereon.

5. The clamp of claim 1 wherein:
(a) said angle of joining between said horizontal bar member and said joining bar members is approximately 135°; and,
(b) the length of said vertical bar members less the length of said joining bar members is slightly less than the thickness of the strips to be clamped together.

6. The clamp of claim 1 wherein:
all said members are of the same material.

7. The clamp of claim 6 wherein:
said material is a solderable material and said vertical bar members include tabs which are soldered to said plate member.

8. A clamp for clamping a plurality of strips of compressible material together comprising:
(a) a plate member;
(b) a pair of vertical bar members carried by said plate member perpendicular thereto and disposed parallel to one another at a distance at least equal to the width of the strips to be clamped together;
(c) a horizontal bar member shorter in length than said distance and disposed in parallel, spaced relationship to said plate member; and,
(d) toggle connecting means connected between respective ones of the ends of said vertical bar members and said horizontal bar member for holding said horizontal bar member in an open position to receive the strips in the space between said horizontal bar member and said plate member and for toggling over center to a closed position holding said horizontal bar member under compression against the strips; and wherein,
(e) said plate member, said vertical bar members, said horizontal bar member, and said toggle connecting means are all of a resiliently rigid and deformable material.

9. The clamp of claim 8 wherein:
said vertical bar members are adapted to cooperate with said toggle connecting means to lock said toggle connecting means and thereby said horizontal bar member in said closed position.

10. The clamp of claim 8 wherein:
the clamp is of unitary construction.

11. The clamp of claim 8 wherein:
said vertical bar members, said horizontal bar member, and said toggle connecting means are of unitary construction.

12. The clamp of claim 8 wherein:
the surface of said plate member opposite the one carrying said said vertical bar members is adapted to carry logo indicia thereon.

13. The clamp of claim 8 wherein:
(a) said horizontal bar member and said toggle connecting means meet at an angle of joining of approximately 135°; and,
(b) the length of said vertical bar members less the length of said toggle connecting means is slightly less than the thickness of the strips to be clamped together.

14. The clamp of claim 8 wherein:
all said members and said toggle connecting means are of the same material.

15. The clamp of claim 14 wherein:
said material is a solderable material and said vertical bar members include tabs which are soldered to said plate member.

* * * * *